US 8,582,499 B2

(12) United States Patent
Sumcad et al.

(10) Patent No.: US 8,582,499 B2
(45) Date of Patent: Nov. 12, 2013

(54) METHOD FOR CONTROLLING THE TIMING OF WIRELESS COMMUNICATIONS INVOLVING TELEMATICS-EQUIPPED VEHICLES

(75) Inventors: Anthony J. Sumcad, Southfield, MI (US); Elizabeth Chesnutt, Troy, MI (US); Kevin R. Krause, Plymouth, MI (US); Ki Hak Yi, Windsor (CA)

(73) Assignee: General Motors LLC, Detroit, MI (US)

( * ) Notice: Subject to any disclaimer, the term of this patent is extended or adjusted under 35 U.S.C. 154(b) by 1534 days.

(21) Appl. No.: 11/964,262

(22) Filed: Dec. 26, 2007

(65) Prior Publication Data
US 2009/0168742 A1 Jul. 2, 2009

(51) Int. Cl.
*H04W 4/00* (2009.01)
(52) U.S. Cl.
USPC .......................................... 370/328; 455/450
(58) Field of Classification Search
None
See application file for complete search history.

(56) References Cited

U.S. PATENT DOCUMENTS

| 5,541,928 A * | 7/1996 | Kobayashi et al. ........ 340/10.31 |
| 2003/0078006 A1 | 4/2003 | Mahany |
| 2004/0142659 A1 * | 7/2004 | Oesterling ................... 455/11.1 |
| 2007/0076650 A1 * | 4/2007 | Manjeshwar et al. ........ 370/328 |
| 2007/0097981 A1 * | 5/2007 | Papasakellariou ............ 370/394 |
| 2008/0085728 A1 * | 4/2008 | Reding et al. ................. 455/466 |

FOREIGN PATENT DOCUMENTS

| CN | 1599270 | 3/2005 |
| DE | 102005046185 | 4/2007 |
| DE | 102005021103 | 5/2012 |
| EP | 1150238 | 5/2012 |

* cited by examiner

*Primary Examiner* — Chi Pham
*Assistant Examiner* — Mohammad Adhami
(74) *Attorney, Agent, or Firm* — Anthony Luke Simon; Reising Ethington P.C.

(57) ABSTRACT

A timing control method for use with wireless communications involving telematics-equipped vehicles. The timing control method generally determines a temporally-distributed sequence of message response times for a group of telematics-equipped vehicles, and then includes these different response times in wireless messages that are sent to the vehicles. In reply, the vehicles use the various message response times to respond in an apportioned or distributed fashion that generally correlates with the temporally-distributed sequence; instead of all at once. In another disclosed method, the response times are determined at each vehicle itself. The methods can be used for requesting data from vehicles via SMS messages.

16 Claims, 4 Drawing Sheets

METHOD FOR CONTROLLING THE TIMING OF WIRELESS COMMUNICATIONS INVOLVING TELEMATICS-EQUIPPED VEHICLES

TECHNICAL FIELD

The present invention generally relates to wireless communications involving telematics-equipped vehicles and, more particularly, to a method for controlling or distributing the timing of wireless communications sent from a large number of telematics-equipped vehicles so that they are not all sent at once.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information.

Telematics-equipped vehicles may communicate with a call center and, at times, the call center may request information from those vehicles. If the call center sends out messages that elicit responses from a large number of telematics-equipped vehicles, then there could be a significant increase in wireless traffic if all of those vehicles were to respond at once. Accommodating such a significant influx in wireless traffic, albeit a temporary influx, can add cost, complexity and strain to the wireless system.

SUMMARY OF THE INVENTION

According to one aspect of the present application, there is provided a method for controlling the timing of wireless communications involving telematics-equipped vehicles. This method generally comprises the steps of: (a) receiving a wireless request message at each of a plurality of telematics-equipped vehicles; (b) providing, for each vehicle, a response time that is different than the response time for one or more of the other vehicles; (c) obtaining, at each vehicle, data requested by the wireless request message; and (d) sending from each vehicle a wireless response message that includes the requested data, wherein the wireless response message is sent from each vehicle at its associated response time.

(a) identifying a plurality of telematics-equipped vehicles; (b) sending wireless messages to the plurality of telematics-equipped vehicles, wherein the wireless messages include instructions that cause individual members of the plurality to respond at different time intervals; and (c) receiving responses from the plurality of telematics-equipped vehicles according to the different time intervals.

According to another aspect of the application, there is provided a method for controlling the timing of wireless communications involving telematics-equipped vehicles. This method generally comprises the steps of: (a) determining first and second message response times; (b) sending wireless request messages to a plurality of telematics-equipped vehicles, wherein at least one of the wireless request messages includes the first message response time and at least one of the wireless request messages includes the second message response time; and (c) sending wireless response messages from the plurality of telematics-equipped vehicles, wherein the wireless response messages that are sent according to the first message response time are generally sent before the wireless response messages that are sent according to the second message response time.

According to another aspect of the application, there is provided a method for controlling the timing of wireless communications involving telematics-equipped vehicles. This method generally comprises the steps of: (a) identifying a plurality of telematics-equipped vehicles; (b) determining a temporally-distributed sequence of message response times that generally attempts to spread out wireless response messages over a period of time; (c) sending wireless request messages from a call center to the plurality of telematics-equipped vehicles; and (d) receiving wireless response messages from the plurality of telematics-equipped vehicles, wherein the wireless response messages are received in an order that generally correlates with the temporally-distributed sequence.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The timing control method described herein generally attempts to control the timing of wireless communications sent from a large number of telematics-equipped vehicles, such as when the vehicles respond to requests for information, by distributing or apportioning them over a period of time. This helps reduce the temporary influx or spike in wireless traffic that would occur if all of the vehicles were to respond at the same time. The timing control method can be used with a variety of wireless communication technologies involving telematics-equipped vehicles, including short message service (SMS), packet data and in-band modem technologies, to name but a few.

Communications System—

Figure 1:
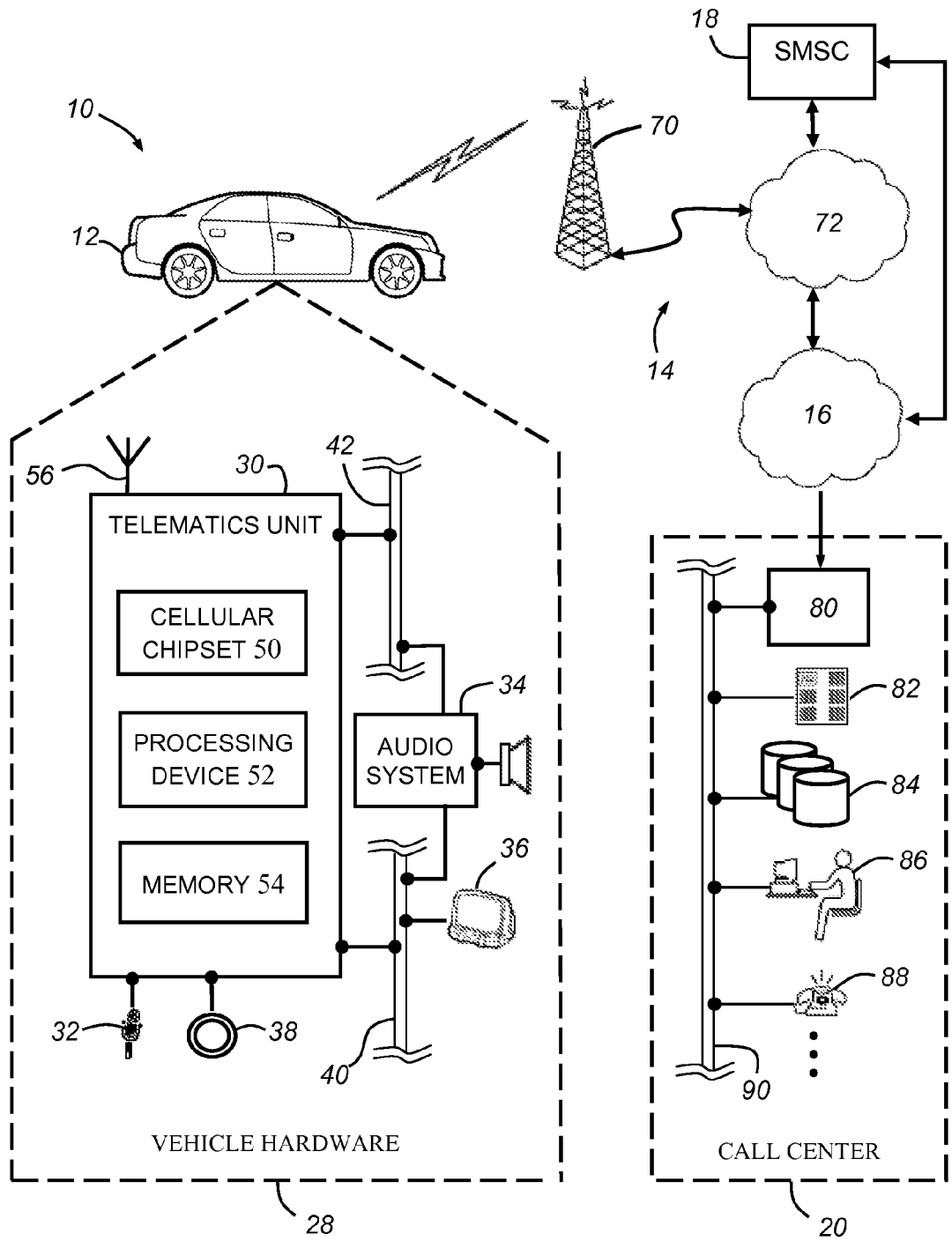
FIG. 1 is a block diagram depicting an exemplary embodiment of a communications system that is capable of utilizing the timing control method disclosed herein.

Beginning with FIG. 1, there is shown an exemplary operating environment that can be used to implement the timing control method disclosed herein. Communications system 10 generally includes a vehicle 12, a wireless carrier system 14, a communications network 16, a short message service center (SMSC) 18, and a call center 20. It should be understood that the timing control method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an Ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, software updates, SMS messaging, etc. According to one embodiment, telematics unit 30 includes a standard cellular chipset 50 for voice communications like hands-free calling and for SMS messaging, a modem (not shown) for data transmission, an electronic processing device 52, one or more electronic memory devices 54, and a dual antenna 56. It should be appreciated that the modem can either be implemented through software that is stored in the telematics unit and is processed by an electronic processing device, or it can be a separate hardware component located internal or external to telematics unit 30. The modem can operate using any number of different standards or protocols such as EVDO, CDMA, 1XRTT, GPRS, EDGE, WiMAX and HSDPA, to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the timing control method discussed herein.

Telematics unit 30 provides too many services to list them all, but several examples include: SMS and other messaging-related services; voice communication services; turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); infotainment-related services where music, webpages, movies, television programs, videogames and/or other information is downloaded by an infotainment module (not shown) and is stored for current or later playback; and software updates where software, patches, service packs, etc. can be automatically or manually deployed and implemented so that the vehicle's software can be kept up-to-date. The above-listed services are by no means an exhaustive list of all of the capabilities of telematics unit 30, but are simply an illustration of some of the services that the telematics unit is capable of offering.

Vehicle hardware 28 also includes a number of vehicle user interfaces that provide vehicle occupants with a means of providing and/or receiving information, including microphone 32, audio system 34, visual display 36, and button 38. These devices allow a vehicle user to receive SMS messages, input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions like SMS messaging. Button 38 is an electronic pushbutton or other control that is typically used to initiate communication with call center 20 or some other service. Of course, numerous other vehicle user interfaces can also be utilized, as the aforementioned interfaces are only examples of some of the possibilities.

Wireless carrier system 14 is preferably a cellular telephone system but could be any other suitable wireless system, such as a satellite-based system, that is capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Short message service center (SMSC) 18 is preferably in communication with wireless carrier system 14 and/or land network 16 and is involved in the communication of SMS messages. The SMSC typically operates according to a store-and-forward principal; that is, when a first user sends an SMS message that is intended for a second user, the SMS message gets stored at SMSC 18 until the second user is available to receive it. In some embodiments, if the SMSC is unable to reach the second user or recipient, then it queues the SMS message and tries again at a later time. In other embodiments, the SMSC employs a store-and-forget approach where it only attempts to pass the SMS message along one time. It should of course be appreciated that the exemplary representation of SMSC 18 is but one example of a suitable arrangement, as the SMSC could instead be provided according to some other configuration known in the art. For instance, SMSC 18 could be integrated within wireless carrier system 14, land network 16 and/or call center 20 instead of being schematically shown as a separate stand-alone component. Also, it is to be understood that multiple SMSCs may be utilized.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder and can be connected to various devices such as a server 82 and database 84. Database 84 could be designed to store account information such as subscriber authentication information, vehicle identifiers, status information, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and/or data transmissions.

Timing Control Method—

As previously mentioned, the timing control method described herein generally attempts to control the timing of wireless communications sent from a large number of telematics-equipped vehicles by distributing or apportioning them over a period of time; this avoids temporary surges in wireless traffic that would occur if all of the vehicles were to respond at the same time. In the past, if a call center wished to elicit information from a large number of vehicles, it would send out a mass request for the desired information. If all of the vehicles were to respond to the request at roughly the same time, then the wireless system could be overwhelmed by the influx in wireless traffic. This is particularly true when the number of vehicles involved is in the many of thousands or even millions. To address these and other concerns, the illustrated timing control method attempts to distribute or even the anticipated responses over a period of time by assigning different message response times. Thus, the wireless communications are sent from the vehicles according to a temporally-distributed sequence or precession, instead of all at once.

Figure 2:
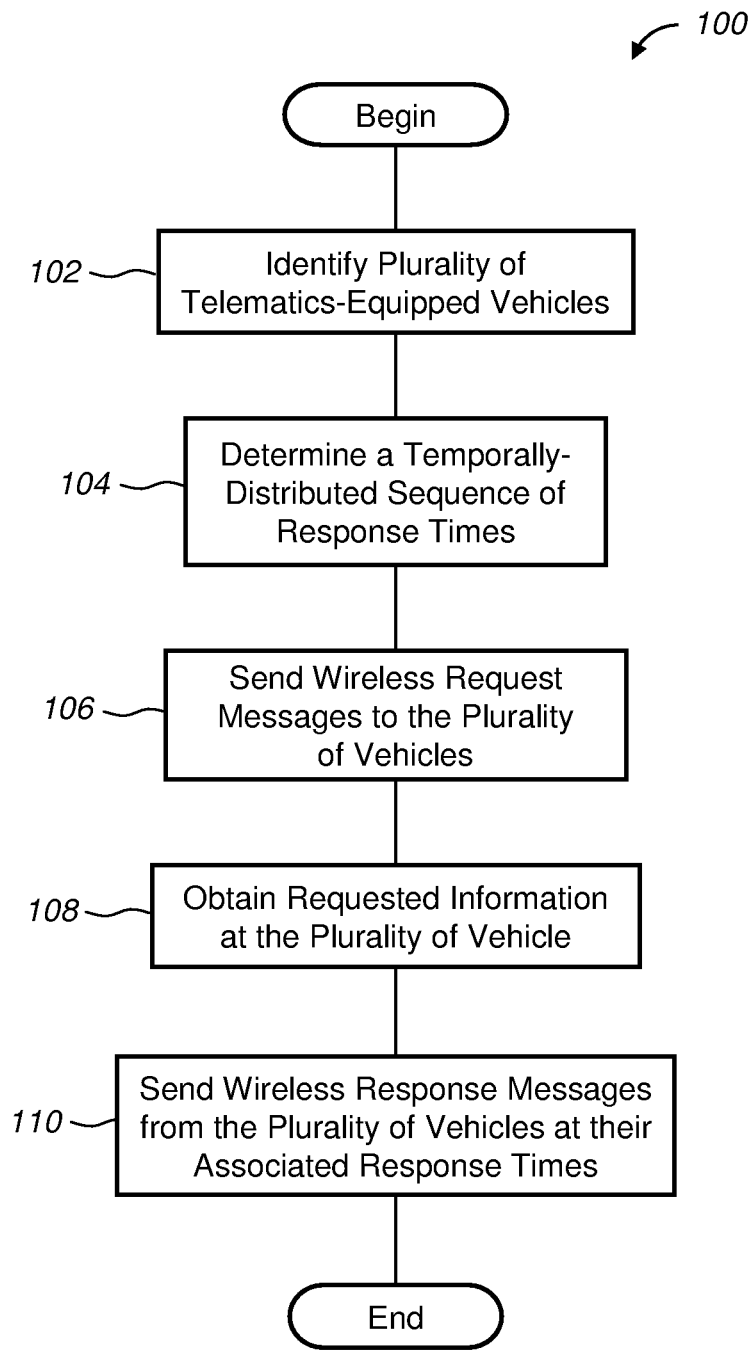
FIG. 2 is a flow chart depicting steps of an embodiment of the timing control method.

Turning to the flowchart in FIG. 2, there is shown some of the steps of an embodiment 100 of the present timing control method. This exemplary embodiment is provided to illustrate some of the aspects and features of the timing control method, and is directed to an embodiment where a call center, such as call center 20, requests the geographic coordinates for each telematics-equipped vehicle in a fleet or group of vehicles. According to this embodiment, call center 20 sends a wireless request message in the form of an SMS message to a large number of telematics-equipped vehicles 12. In response, each of the vehicles sends a wireless response message back to the call center, but the response message uses a packet data format instead of SMS. Again, it should be appreciated that this is simply an exemplary embodiment of the timing control method, as that method may use messaging technologies other than the SMS/packet data combination stated above, and it may be implemented in a number of different scenarios including ones that are unrelated to geographic coordinates.

Beginning with step 102, the timing control method identifies a plurality of telematics-equipped vehicles from which it wishes to elicit information. In this case, the plurality of vehicles is a fleet or group of thousands of vehicles and the desired information is geographic coordinate information, although that can of course differ. The fleet of vehicles can range in number from only a couple of vehicles to millions of vehicles in some cases. According to one embodiment, resources within call center 20 are used to obtain one or more vehicle identifiers for each of the telematics-equipped vehicles within the fleet. A vehicle identifier is any piece of information that can be used to uniquely identify a particular telematics-equipped vehicle. Some examples of potential vehicle identifiers include, but are certainly not limited to: electronic serial numbers (ESNs), mobile equipment identifiers (MEIDs), mobile identification numbers (MINs), mobile directory numbers (MDNs), media access control addresses (MAC addresses), Internet protocol addresses (IP addresses), telematics unit station identifiers (STIDs), vehicle identification numbers (VINs), and subscriber account numbers and/or names. In the present embodiment, SMS messages are being sent from the call center to the fleet of vehicles over a standard voice channel, as is appreciated by those skilled in the art. Thus, an ESN, MIN and/or MDN is needed for each of the thousands of vehicles in the fleet.

Next, step 104 determines a temporally-distributed sequence of message response times that is generally designed to spread out the responses from the fleet of telematics-equipped vehicles over a period of time. These message response times generally dictate when the vehicles will respond to the wireless request messages sent by the call center so that they do not all respond at the same time. As an example, if the fleet consists of one hundred thousand vehicles, then step 104 may decide to break the fleet up into one thousand groups of one hundred vehicles each where each group has its own message response time. In that case, the temporally-distributed sequence will include one thousand different message response times; a first message response time for the first group of one hundred vehicles, a second message response time for the second group of one hundred vehicles, and so on.

It should be appreciated that the distribution or apportionment of vehicles according to the temporally-distributed sequence can vary depending on the needs and nature of the wireless communications being sent. For instance, the groups can include the same number or different numbers of vehicles, the groups can be assigned the same time intervals or different time intervals, the groups can all be queried for the same information or they may be asked for different pieces of information, the groups can be asked to respond with a universal message type or they can be instructed to respond with different message types, and the groups can be asked to respond to the same recipient or to different recipients, to cite but a few possibilities. The size, number and constituency of the groups can vary depending on a number of different factors, and can range from very large numbers of vehicles per group to as small as one vehicle per group.

There are a number of factors that can be utilized to determine the temporally-distributed sequence, including the following: the estimated response size, the estimated response volume, the estimated response time, the estimated response type, the estimated geographic distribution of the responses, and the intended response recipient, to name but a few. To elaborate, in the one hundred thousand vehicle fleet example above, call center 20 could take into account the estimated response size. Since the geographic coordinates of each of the vehicles is being requested and that information typically results in a relatively small message response size, step 104 may decide to have a larger number of vehicles per group (one hundred vehicles in the example above). If, on the other hand, the call center was requesting a full diagnostic checkup for each of the vehicles in the fleet—a request that would likely generate larger message response sizes—then step 104 may divide the test fleet into smaller groups, say ten vehicles per group.

Step 104 can also take into account the estimated response volume when determining the temporally-distributed sequence. In the example above, there are a total of one hundred thousand vehicles in the fleet. If step 104 were to divide that fleet into groups of ten, then there would be a total of ten thousand groups, each of which required its own message response time. Assuming that the message response times are spaced thirty seconds apart, it would take over eighty-three hours to hear back from all of the groups (10,000 groups*30 seconds=300,000 seconds); this might be too long for some applications, thus the number of groups would have to be reduced. Contrast that with a scenario where there is only a total of one thousand vehicles in the fleet. In that case, having ten vehicles per group would only result in one hundred groups, which in turn would take less than an hour to hear back from them all. Thus, the estimated response volume can play a role in determining the temporally-distributed sequence.

Another factor that can be taken into account during the determination of step 104 is the estimated response time; that is, the day and/or time that the call center expects the vehicles to respond to its request. If the estimated response time coincides with a high traffic time—say during the week during rush hours when many operators are driving their vehicles—then step 104 could divide the fleet into smaller groups, as the wireless system is likely already under a fair amount of stress. Alternatively, step 104 could keep the number of vehicles per group large and adjust the message response time so that the vehicles respond back at some other, non-peak time. Put differently, instead of easing the pressure on the wireless system by dividing the fleet into smaller groups, the timing control method could instruct the vehicles to send their responses at a time when little wireless traffic is expected. Accordingly, the estimated response time can be used to reduce or mitigate the expected impact on wireless traffic.

Step 104 could also consider the estimated response type as a factor in determining the temporally-distributed sequence. If the call center was instructing the vehicles to respond with a packet data-type message and packet data messages are known to use more system resources than SMS messages, for example, then this could affect the size and nature of how step 104 divides the fleet into groups. For instance, step 104 could decide to make the groups of vehicles smaller if packet data messages are the estimated response type; again, in an effort to reduce the impact on the wireless system. Conversely, if less resource intensive response types like SMS messages or in-band modem messages are expected, then the fleet could be divided into larger groups of vehicles or they could be allowed to transmit during higher wireless traffic times, etc. It is also possible for the call center to instruct the different groups of vehicles to respond with different message response types; i.e.—a first group responds with an SMS message, a second group responds with a packet data message, etc. It should therefore be appreciated that the estimated response type can be utilized, and in some cases specifically selected, by the present method to ease or mitigate the impact on the corresponding wireless system.

The estimated geographic distribution of the responses can also be a factor in the determination of step 104. If the geographic distribution of the responses is expected to be concentrated in a cellular region or other area that is highly trafficked or has scant wireless resources, for example, then the timing control method could take this into account as it decides the most optimum way in which to divide the fleet of vehicles. Referring to the above-provided example, if the one hundred thousand telematics-equipped vehicles in the fleet represent all of the vehicles sold in a highly populated urban area over a certain time period, then it could be reasonably expected that a majority of those vehicles are currently operating in a high wireless traffic area. Thus, step 104 could take this into account by manipulating one or more factors, such as those provided above, in order to ease the effects on the corresponding wireless system. The opposite would hold true if the estimated or expected geographic distribution pointed to a sparsely populated geographic area; although, the wireless capacity in that area could play a counterbalancing role.

Step 104 could also consider the intended recipient of the responses—that is, the entity that is expected to receive the response messages sent by the fleet of vehicles—as another factor. If all of the vehicles in the fleet are instructed to send responses to the same entity or intended recipient and that entity is already highly utilized by other applications, then a temporary influx or spike in traffic could be undesirable. In that case, step 104 may decide to reduce the number of vehicles per group so that when the group sends a batch of responses to the intended recipient it doesn't overwhelm it. It is also possible for step 104 to change or manipulate the intended recipients; i.e.—instruct some vehicles to send responses to certain intended recipients and other vehicles to send responses to other intended recipients. Again, the aforementioned factors are only some of the factors that may be used by the present timing control method to determine a temporally-distributed sequence of response times, as numerous other factors could be used as well.

In step 106, wireless request messages are sent from the call center to the plurality of telematics-equipped vehicles which include instructions that cause individual vehicles to respond at different time intervals. Each of the wireless request messages preferably includes instructions that specify when the corresponding vehicle is to respond to the message. According to one embodiment, each wireless request message includes the following components: the requested information, an intended recipient, and a message response time that is part of the temporally-distributed sequence. The first component or requested information informs the vehicle of what is being sought; i.e.—geographic coordinates in the example above. The requested information could be embodied in the form of a code or some other abbreviated instructions or it could be spelled out in an appropriate protocol; so long as the telematics-equipped vehicle receiving the message knows what information it is supposed to gather. As mentioned above, different types of information other than geographic coordinates, such as diagnostic information, status information, etc. could also be requested.

As discussed above, the intended recipient designates the entity that is to receive the response from the various telematics-equipped vehicles. This designation could be implemented in a number of ways. For instance, the wireless request message could used codes to identify the intended recipient or it could expressly identify them by providing an ESN, MDN, MIN, IP address, or the like. Alternatively, the vehicle and call center could have a predetermined arrangement in place such that when a vehicle receives a message from sender A it knows the intended recipient is entity B, or if the vehicle receives a wireless response message seeking certain types of information then the intended recipient is entity C, or if the vehicle receives a wireless request message on a certain day or at a certain time, then the intended recipient is entity D. These are only a few possibilities for conveying information as to the intended recipient.

The message response time generally dictates the time at which the vehicle responds to the wireless request message. As above, the message response time could be expressed in a variety of ways. It could simply be expressed as an absolute value (i.e.—8:00 AM GMT, Jan. 1, 2008); it could be expressed as an amount of time referenced to some event (i.e.—thirty minutes from the time which the vehicle receives this message, or thirty seconds following the next time the vehicle's ignition is started, for example); it could be expressed according to another format known to those skilled in the art; or as some combination thereof. Thus, the message response time can be conveyed in any appropriate manner so long as the vehicle receiving the wireless request message knows when it is supposed to respond. The message response times generally determine, or at least affect, the time intervals at which the vehicles respond. These time intervals may be adjusted in order to mitigate or ease the burden on the corresponding wireless network. For example, if a certain group of vehicles is expected to transmit a large block of data to an intended recipient, the timing control method could determine that a larger time interval is needed. That is, by spacing out the message response times over a larger period of time, the intended recipient is given more time to receive and process the incoming information before the next wave of wireless response messages arrive. In some cases, all of the time intervals will be the same; in other cases, the time intervals could vary by group in order to accommodate the particular needs of the situation.

According to one embodiment, step 106 is carried out by sending SMS messages from call center 20 to a fleet of telematics-equipped vehicles 12, where the message response time and other message components are provided in a payload section of the SMS message. Of course, other message types and technologies could be used to transmit the wireless request messages, including packet data messages, in-band modems, and others known to skilled artisans. If a mobile-terminated packet data message is sent to the vehicles, a temporary IP address will likely need to be obtained for each vehicle.

Because this process can be somewhat time and resource consuming, it is sometimes more efficient to simply send an SMS message to the various telematics-equipped vehicles in the fleet. It is possible for step 106 to instead send a small number of wireless messages to a select group of vehicles, and for those vehicles to then propagate the message to other vehicles. This type of arrangement can be found in dedicated short range communications (DSRC) or vehicle-to-vehicle communications systems, for example.

In step 108, the telematics-equipped vehicles gather the requested information and prepare it for transmission to the intended recipient. In the case of geographic coordinates, the vehicle could query or gather the information from a GPS unit and process the data for wireless transmission. Of course, other vehicle electronic modules and devices around the vehicle could be queried as well, depending on the nature of the information being requested.

After the telematics-equipped vehicle has acquired the requested information, it sends a wireless response message back to the intended recipient at its associated response time, step 110. As explained above, these message response times (time intervals) are part of the temporally-distributed sequence developed in step 104. It is one of the objectives of the temporally-distributed sequence to spread out the wireless response messages coming in from the plurality of vehicles so that they are received in a more even or balanced precession instead of in a simultaneous cluster. It is possible for the wireless response messages to be sent according to one of a variety of formats and technologies, including SMS messages, packet data messages, in-band modem messages, etc.

It is worth noting that sending a mobile-originated wireless response messages in packet data form is usually more efficient than sending a mobile-terminated wireless request message in packet data form. This is, at least in part, attributable to having to acquire a temporary IP address for each vehicle in the fleet for the mobile-terminated case; a step that is not necessary for mobile-originated messages. Therefore, according to the particular embodiment just described, the call center sends an SMS message to the vehicles, but expects to receive packet data messages in return. Again, this is not necessary, as it is only one possible embodiment.

It should also be pointed out that a variety of factors could prevent every member of a group of vehicles from sending their wireless response messages at the apportioned time. For example, if one or more vehicles in a particular group have their ignitions turned off, are out of wireless range, or are experiencing some other conditions that prohibit wireless communication, then these vehicles may not send their wireless response messages at the same time as other vehicles in their group; even if they all have the same message response times. Thus, when it is stated that wireless response messages are received "according to different time intervals," or sent "according to first and second message response times" or received in an order that "generally correlates with a temporally-distributed sequence," it should be appreciated that this generally refers to the group or fleet of vehicles as a whole and does not require that every single vehicle respond at the apportioned time.

Figure 3:
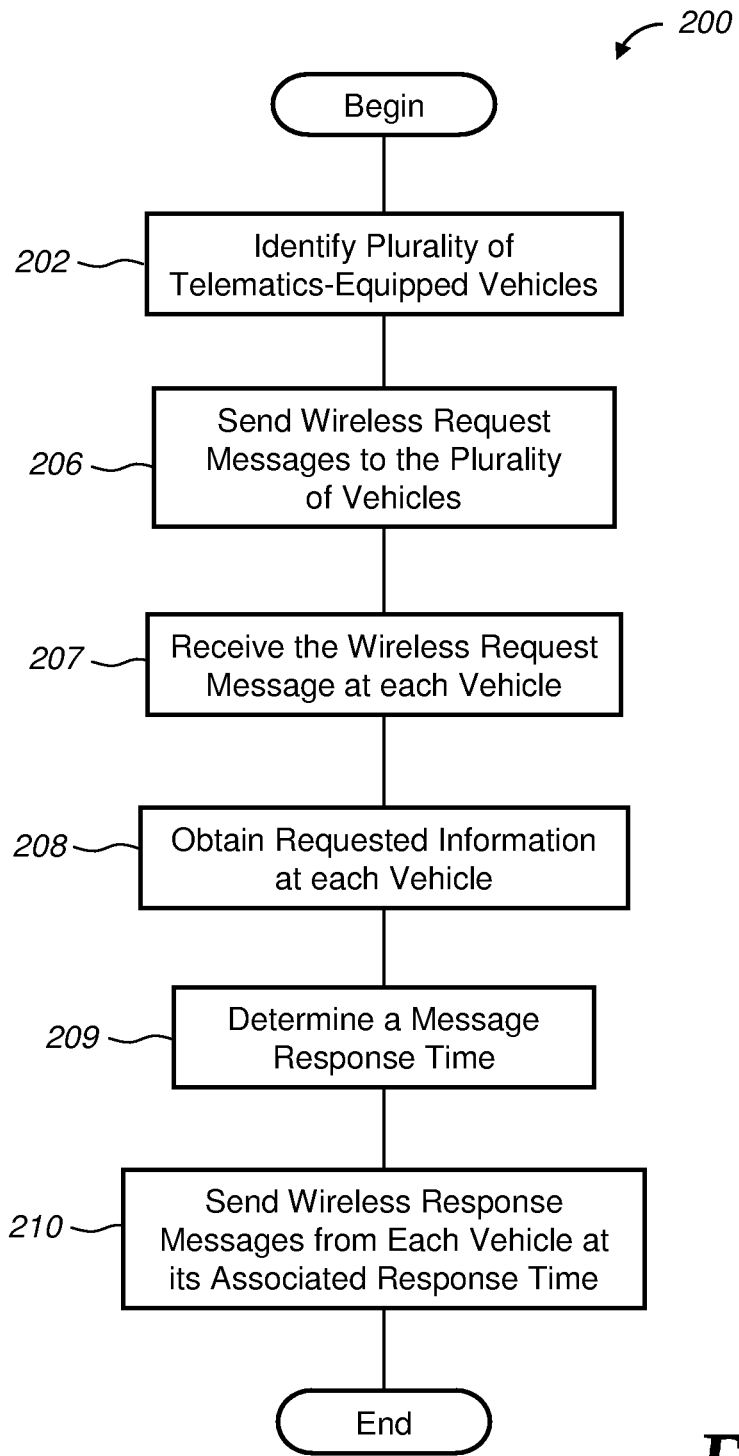
FIG. 3 is a flow chart depicting steps of a second embodiment of the timing control method.

The method 100 described above is useful where the call center 20 determines the message response times and provides that information to each vehicle as a part of the wireless request message. However, determination of the response time for each vehicle can be carried out at the vehicle itself without any instruction or information from the call center. Thus, in the embodiment 200 of FIG. 3, the determination of a response time is carried out at the vehicle, after receiving the wireless request message. In particular, the method 200 involves identifying a plurality of telematics-equipped vehicles (202), sending wireless request messages to the plurality of vehicles (206), receiving the wireless request message at each vehicle (207), obtaining the requested data at each vehicle (208), determining a message response time (209), and then sending a wireless response message from each vehicle at its associated message response time (210). Steps 202, 206, 208, and 210 can be the same as the respective steps 102, 106, 108, and 110 of method 100, and all of the discussion concerning those steps applies equally to the embodiment of FIG. 3.

For this method 200, the wireless request message can specify to the vehicles that they are to send their response messages according to an appropriate response time determined by the vehicle. That is, vehicle can send its response message at a determined time even where the requesting message does not specify that the vehicle is to do so, or instead the request message can contain a flag or instruction that tells the vehicle to send the response at a future time, without specifying when, with the vehicle then determining the appropriate response time.

Various techniques can be used by the vehicle to calculate or otherwise determine a suitable response time. For example, a unique identifier such as any of the various mobile device or vehicle identifiers (VIN, STID, ESN, etc.) identified above can be used for this purpose. The telematics unit can use such as an ID (for example, the STID that uniquely identifies the telematics unit) to determine a response time. In particular, the last digit or last two digits can be used to calculate an offset from a predetermined time. As one example, the last digit could be used to specify which minute within the next ten minutes (following receipt of the request message) is to be used as the response time. Thus, if the request message is received at 11:58 am, and the STID ends in a "1", then the response message is sent back at 12:01 pm, whereas, if the STID was a "5", then the response message would be sent back at 12:35 pm.

Allowing the vehicle to determine the response time may provide less coordination of responses compared to the method 100 of FIG. 2, but it simplifies the work at SMSC 18 and/or call center 20 where the request messages originate from, and eliminates the need for including response times and possibly even response instructions in the wireless request message.

Figure 4:
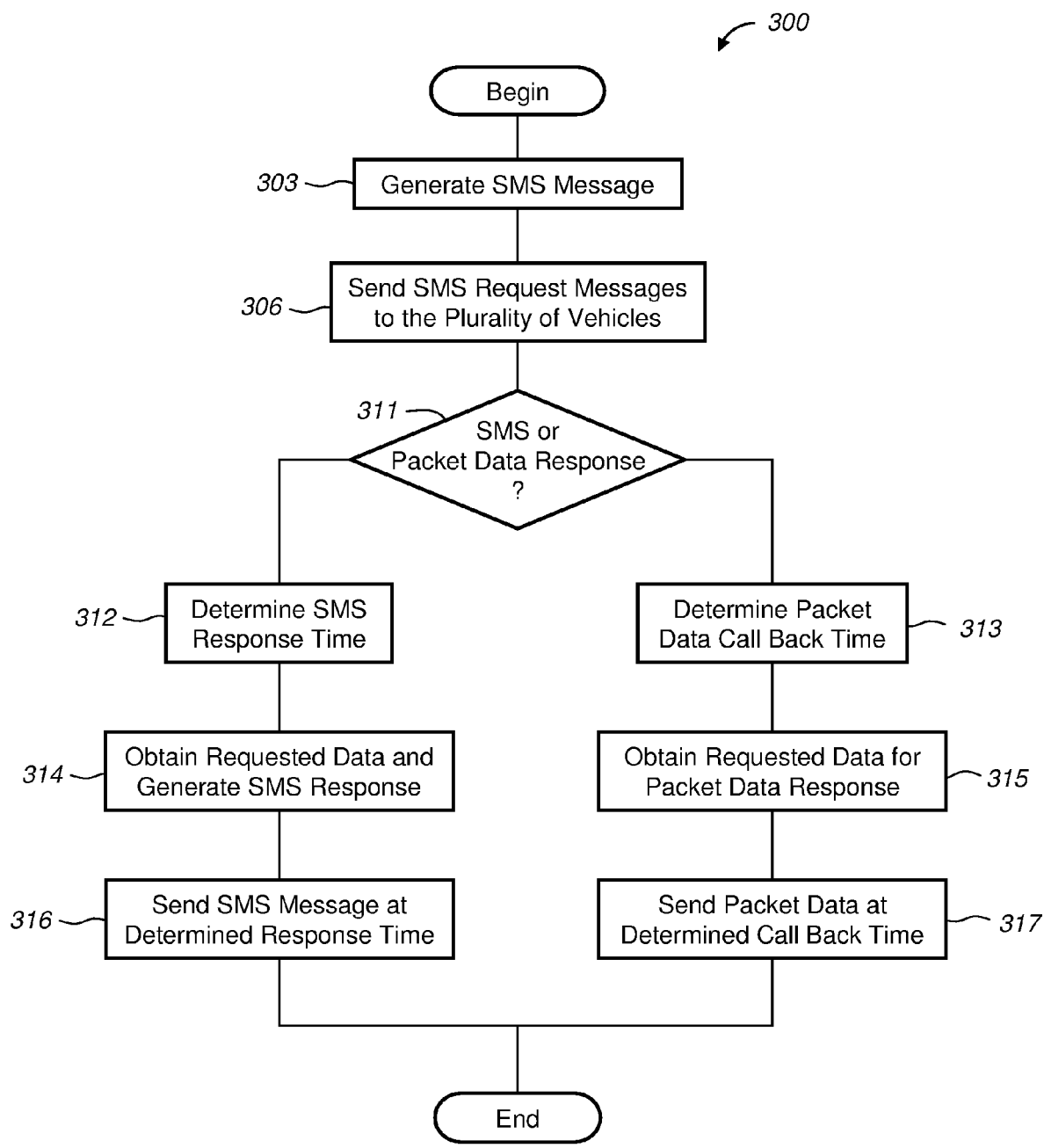
FIG. 4 is a flow chart depicting another embodiment that uses SMS requesting messages.

Turning now to FIG. 4, there is another embodiment 300 directed to one specific implementation that uses SMS messages from SMSC 18 as the wireless request messages. This embodiment can use the approach of either method 100 or 200, such that the determination of appropriate response times can be predetermined and included in the SMS requests, or can be determined individually at each vehicle. The method 300 involves generating an SMS message (303) that operates as the wireless request message. Then, the message is sent to each of a plurality of vehicles (306). At the vehicle, it is determined whether the wireless response message should be as a return SMS message or as packet data (311). In another embodiment, another response option would be to send data via a wireless voice call, and techniques for transmitting data over a voice channel of a cellular wireless connection (CDMA or other) is known to those skilled in the art.

For SMS responses, the process moves to block 312 where the vehicle determines a response time, obtains the desired data and generates an SMS response at step 314 (e.g., incorporates the data into the payload of an SMS message), and then sends the SMS response message at the determined response time (316). Where the desired response is to be sent via packet data, the process moves from block 311 to block 313 where an appropriate packet data call back time (response time) is determined, then the desired data for the response is obtained (315), and finally the packet data connection is initiated and the data transferred at the determined call back time (317).

The determination of an appropriate response time from steps 312 and 313 can be done at the vehicle (for example using a unique identifier as discussed above) or at the SMSC 18 or other central facility and included in the SMS request message.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in FIG. 4, the steps of determining an appropriate response time and obtaining the desired data for responding could instead be carried out prior to block 311 since those steps can be made independent of the particular type of response (SMS v. packet data). All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling the timing of wireless communications involving telematics-equipped vehicles, comprising the steps of:
    (a) receiving a wireless request message at each of a plurality of telematics-equipped vehicles;
    (b) providing, for a group of vehicles, a response time that is different than the response time for one or more other groups of vehicles, and is determined based on a unique identifier stored at each vehicle, wherein the message response time for the vehicles within the group is the same, and wherein a group comprises a plurality of vehicles;
    (c) obtaining, at each vehicle, data requested by the wireless request message; and
    (d) sending from each vehicle a wireless response message that includes the requested data, wherein the wireless response message is sent from each vehicle at its associated response time.

2. The method of claim 1, further comprising the step of determining the different response times by utilizing at least one factor selected from the list consisting of: an estimated response size, an estimated response volume, an estimated response time, an estimated response type, an estimated geographic distribution of the responses, and an intended response recipient.

3. The method of claim 1, further comprising the step of adjusting the size and/or number of the groups so that the impact to a corresponding wireless system is reduced.

4. The method of claim 1, further comprising the step of adjusting the message response times of each group so that the impact to a corresponding wireless system is reduced.

5. The method of claim 1, further comprising the step of selecting the message response types of each group so that the impact to a corresponding wireless system is reduced.

6. The method of claim 1, wherein the step of providing a response time for each group of vehicles comprises including instructions in the wireless request message that cause each vehicle to respond at its associated response time.

7. The method of claim 1, wherein step (a) further comprises receiving short message service (SMS) messages at each group of vehicles, wherein each SMS message includes the instructions for responding at the associated response time in a payload section of the SMS message.

8. A method for controlling the timing of wireless communications involving telematics-equipped vehicles, comprising the steps of:
(a) determining first and second message response times based on a unique identifier stored at a vehicle;
(b) sending wireless request messages to a plurality of groups of telematics-equipped vehicles, wherein a first group receives a wireless request messages including the first message response time and a second group receives a wireless request messages including the second message response time, wherein a group comprises a plurality of telematics-equipped vehicles; and
(c) sending wireless response messages, at the message response time included in the wireless request messages, from the plurality of groups of telematics-equipped vehicles in reply to the wireless request messages, wherein the wireless response messages that are sent according to the first message response time are generally sent before the wireless response messages that are sent according to the second message response time.

9. The method of claim 8, further comprising the step of determining the first and second message response times by utilizing at least one factor selected from the list consisting of: an estimated response size, an estimated response volume, an estimated response time, an estimated response type, an estimated geographic distribution of the responses, and an intended response recipient.

10. The method of claim 8, wherein each wireless request message to the plurality of telematics-equipped vehicles includes the following components: requested information, an intended recipient and a message response time.

11. The method of claim 8, wherein the wireless request messages are short message service (SMS) messages that include the message response times in payload sections of the SMS messages.

12. The method of claim 11, wherein the wireless response messages are packet data messages.

13. A method for controlling the timing of wireless communications involving telematics-equipped vehicles, comprising the steps of:
(a) identifying a first and a second group of telematics-equipped vehicles, wherein a group comprises a plurality of telematics-equipped vehicles;
(b) determining a temporally-distributed sequence of message response times for the first and second groups of telematics-equipped vehicles, that generally attempts to spread out wireless response messages over a period of time, the determination of the temporally-distributed sequence considers at least one factor selected from the list consisting of: an estimated response size, an estimated response volume, an estimated response time, an estimated response type, an estimated geographic distribution of the responses, and an intended response recipient, wherein the temporally-distributed sequence of message response times is based on unique identifiers stored at the plurality of telematics-equipped vehicles, and wherein the message response time for the vehicles within the group is the same;
(c) sending wireless request messages from a call center to the first and second groups of telematics-equipped vehicles, each of the wireless request messages includes a message response time that is part of the temporally-distributed sequence; and
(d) receiving wireless response messages from the first and second groups of telematics-equipped vehicles, wherein the wireless response messages are received in an order that generally correlates with the temporally-distributed sequence.

14. The method of claim 13, wherein each wireless request message sent to the first and second groups of telematics-equipped vehicles includes the following components: requested information, an intended recipient and a message response time.

15. The method of claim 13, wherein step (c) further comprises sending short message service (SMS) messages from the call center to the first and second groups of telematics-equipped vehicles, where the SMS messages include the message response times in payload sections of the SMS messages.

16. The method of claim 15, wherein step (d) further comprises receiving packet data messages from the plurality of telematics-equipped vehicles.

* * * * *